UNITED STATES PATENT OFFICE.

WESLEY W. BARNES, OF NEW YORK, AND JOHN D. EMACK, OF BALDWIN, NEW YORK.

COMPOSITION OF MATTER SUITABLE FOR CASTING MEDALLIONS, TILES, PICTURE-FRAMES, MOLDINGS, &c.

SPECIFICATION forming part of Letters Patent No. 339,519, dated April 6, 1886.

Application filed March 11, 1886. Serial No. 194,926. (Specimens.)

*To all whom it may concern:*

Be it known that we, WESLEY W. BARNES, of the city, county, and State of New York, and JOHN D. EMACK, of Baldwin, Queens county, New York, have invented a new Composition of Matter Suitable for Casting Medallions, Tiles, Picture-Frames, Moldings, &c.; and we do declare the following to be a full, clear, and correct description of our invention.

The nature of our invention consists in the production of a new composition of matter for casting purposes, from the ingredients and in the manner hereinafter set forth, the object of the invention being the production, at a low cost, of a composition of matter for casting purposes.

To enable those skilled in the art to make and use our invention, we will describe the same.

Our compostion of matter is composed of the following ingredients, in about the following proportions: soluble glass, one hundred parts; ground flint, eighty parts; ground iron, thirty parts; roll sulphur, forty parts. These ingredients are placed in a kettle in a dry state, and the kettle placed over a fire, and the ingredients are stirred, and the stirring continued, and the kettle kept over the fire until a temperature of 360° Fahrenheit is attained, when the composition is ready for pouring into molds for the production of various articles usually formed by casting.

When a stronger article of composition is desired, a smaller quantity of sulphur and a greater quantity of soluble glass is employed, and to color the article produced any desired mineral coloring-matter may be employed with the ingredients named.

This composition of matter may be employed in the manufacture of burial-caskets, bath-tubs, billiard-tables, medallions, tiles, picture-frames, moldings, buttons, door-knobs, or to any articles that can be cast or molded.

The mode of applying the invention is to mix the ingredients, as stated, in a kettle over a fire until a temperature of 360° Fahrenheit is reached, when the composition may be poured into molds of the configuration or carrying the design to be reproduced.

Having now set forth our invention, we claim as new—

A composition of matter formed by combining soluble glass, ground flint, ground iron, and roll sulphur, in about the proportions set forth, in the manner described.

WESLEY W. BARNES.
JOHN D. EMACK.

In presence of—
W. V. H. HICKS,
A. SIDNEY DOANE.